United States Patent
Iwamura et al.

(10) Patent No.: US 9,148,887 B2
(45) Date of Patent: Sep. 29, 2015

(54) MOBILE COMMUNICATION METHOD, RADIO BASE STATION, AND MOBILE STATION

(75) Inventors: Mikio Iwamura, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 43 days.

(21) Appl. No.: 14/113,038

(22) PCT Filed: Apr. 19, 2012

(86) PCT No.: PCT/JP2012/060535
§ 371 (c)(1),
(2), (4) Date: Oct. 21, 2013

(87) PCT Pub. No.: WO2012/144545
PCT Pub. Date: Oct. 26, 2012

(65) Prior Publication Data
US 2014/0038633 A1    Feb. 6, 2014

(30) Foreign Application Priority Data
Apr. 22, 2011 (JP) ................. 2011-096312

(51) Int. Cl.
*H04W 72/08* (2009.01)
*H04W 24/10* (2009.01)
*H04W 72/02* (2009.01)
*H04W 76/02* (2009.01)
*H04L 5/00* (2006.01)

(52) U.S. Cl.
CPC ............ *H04W 72/085* (2013.01); *H04W 24/10* (2013.01); *H04W 72/02* (2013.01); *H04L 5/0091* (2013.01); *H04W 76/023* (2013.01)

(58) Field of Classification Search
CPC ... H04W 24/10; H04W 28/08; H04W 76/023; H04W 88/08; H04L 5/0091
USPC ................ 455/452.2, 411, 561, 524; 370/328
See application file for complete search history.

(56) References Cited

U.S. PATENT DOCUMENTS

| 2003/0179728 A1* | 9/2003 | Canning et al. ............... 370/328 |
| 2010/0261469 A1 | 10/2010 | Ribeiro et al. |
| 2011/0294534 A1* | 12/2011 | Gunder ......................... 455/524 |

FOREIGN PATENT DOCUMENTS

| JP | 2006-014295 A | 1/2006 |
| WO | 2009/084465 A1 | 7/2009 |

OTHER PUBLICATIONS

Japanese Office Action issued in Japanese Patent Application No. 2011-096312, mailing date Oct. 8, 2013, with English translation thereof (5 pages).

(Continued)

*Primary Examiner* — Phuoc H Doan
(74) *Attorney, Agent, or Firm* — Osha Liang LLP

(57) ABSTRACT

The radio quality among a plurality of mobile stations is measured. A mobile communication method according to the present invention includes the steps of: transmitting, by a radio base station eNB, a setting signal #1 regarding an RS#1 to a mobile station UE#1 through a Uu interface; transmitting, by the radio base station eNB, a setting signal #2 regarding an RS#2 to a mobile station UE#2 through the Uu interface; transmitting, by the mobile station UE#1, the RS#1 to the mobile station UE#2 through a Ud interface based on the setting signal #1; and transmitting, by the mobile station UE#2, the RS#2 to the mobile station UE#1 through the Ud interface based on the setting signal #2.

9 Claims, 3 Drawing Sheets

(56) References Cited

OTHER PUBLICATIONS

Search Report issued in corresponding European Application No. 12773677.5, mailed Oct. 7, 2014 (8 pages).
Doppler K et al.; "Device-to-Device communications; functional prospects for LTE-Advanced networks"; Finland; Jun. 14, 2009 (6 pages).
International Search Report issued in PCT/JP2012/060535 mailed on Jun. 12, 2012 (2 pages).
3GPP TS 36.300 V 10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).

* cited by examiner

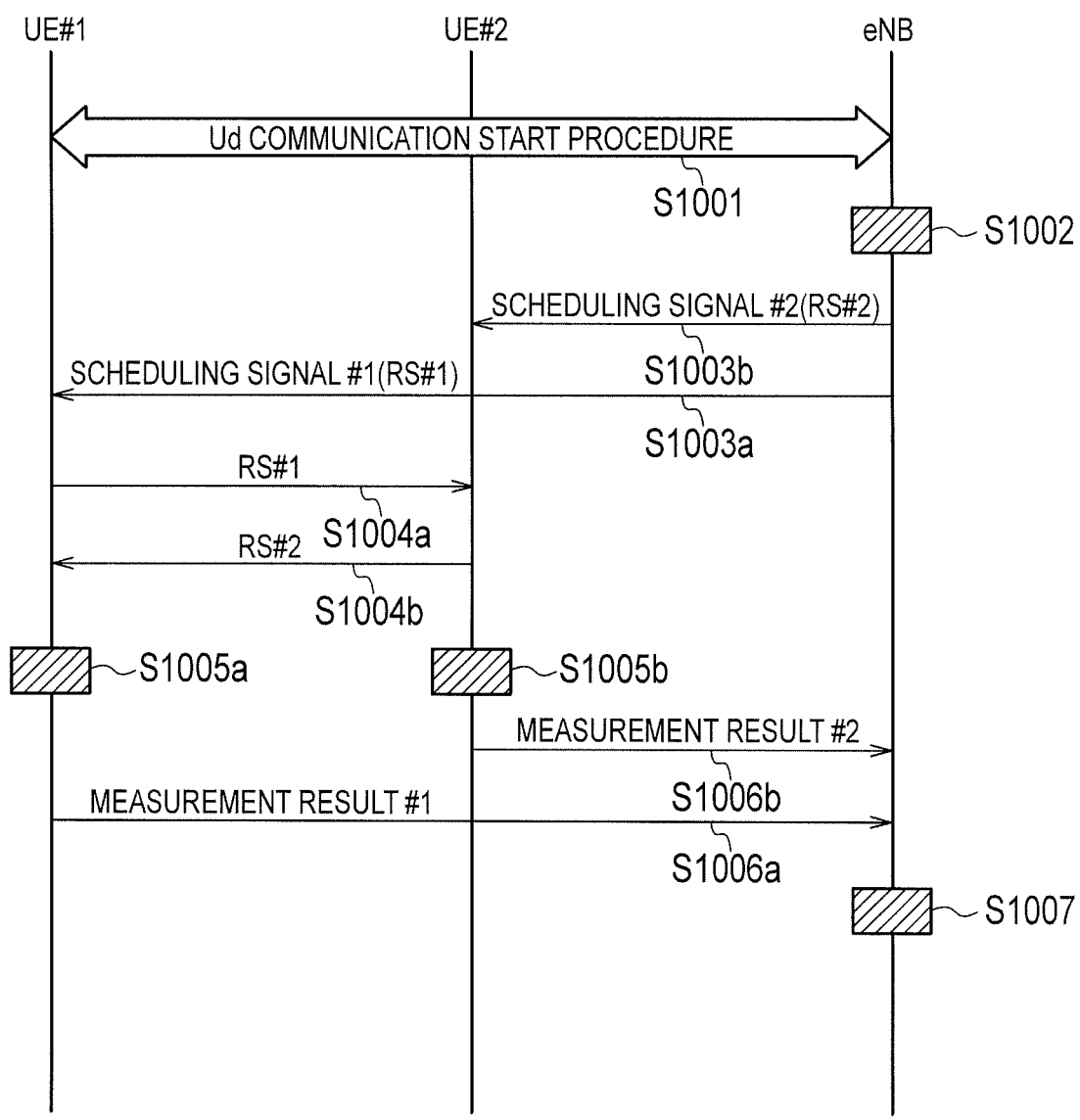

US 9,148,887 B2

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

Cellular mobile communication systems such as a wideband-code division multiple access (W-CDMA) system and a long term evolution (LTE) system are configured such that communication among a plurality of mobile stations UE is performed through a radio access network device, a core network device, and the like.

CITATION LIST

Non-Patent Literature

Non-Patent Literature 1: 3GPP TS36.300

However, the previous cellular mobile communication systems have a problem that, when the communication among a plurality of mobile stations UE is performed, the communication cannot be controlled in consideration of the radio quality among the mobile stations.

That is, since the previous cellular mobile communication systems are configured such that a signal for measuring the radio quality is transmitted only between a radio base station and the mobile stations, there is a problem that the radio quality among the plurality of mobile stations cannot be measured.

The present invention has been made in view of the problem above, and an objective is to provide a mobile communication method, a radio base station, and a mobile station that enable measurement of the radio quality among a plurality of mobile stations.

SUMMARY OF THE INVENTION

A first characteristic of the present invention is a mobile communication method for performing transmission/reception of a data signal between a first mobile station and a second mobile station through an interface between mobile stations set between the first mobile station and the second mobile station without through a radio base station interface set between the mobile stations and a radio base station, the method including the steps of: transmitting, by the radio base station, a first setting signal regarding a first reference signal to the first mobile station through the radio base station interface; transmitting, by the radio base station, a second setting signal regarding a second reference signal to the second mobile station through the radio base station interface; transmitting, by the first mobile station, the first reference signal to the second mobile station through the interface between mobile stations based on the first setting signal; and transmitting, by the second mobile station, the second reference signal to the first mobile station through the interface between mobile stations based on the second setting signal.

A second characteristic of the present invention is a radio base station used in a mobile communication system configured to be capable of performing transmission/reception of a data signal between a first mobile station and a second mobile station through an interface between mobile stations set between the first mobile station and the second mobile station without through a radio base station interface set between the mobile stations and a radio base station, the radio base station including: a transmission unit configured to transmit a first setting signal regarding a first reference signal to the first mobile station through the radio base station interface, and to transmit a second setting signal regarding a second reference signal to the second mobile station through the radio base station interface, in which the first setting signal instructs a resource for transmitting the first reference signal from the first mobile station to the second mobile station through the interface between mobile stations, and the second setting signal instructs a resource for transmitting the second reference signal from the second mobile station to the first mobile station through the interface between mobile stations.

A third characteristic of the present invention is a mobile station used as a first mobile station in a mobile communication system configured to be capable of performing transmission/reception of a data signal between the first mobile station and a second mobile station through an interface between mobile stations set between the first mobile station and the second mobile station without through a radio base station interface set between the mobile stations and a radio base station, the mobile station including: a reception unit configured to receive a first setting signal regarding a first reference signal from the radio base station through the radio base station interface; and a transmission unit configured to transmit the first reference signal to the second mobile station through the interface between mobile stations based on the first setting signal.

BRIEF DESCRIPTION OF DRAWINGS

FIG. 4 is a sequence diagram indicating an operation of the mobile communication system according to the first embodiment of the present invention.

DESCRIPTION OF EMBODIMENTS (A Mobile Communication System According to a First Embodiment of the Present Invention)

A mobile communication system according to a first embodiment of the present invention will be described with reference to FIGS. 1 to 4.

Figure 1:
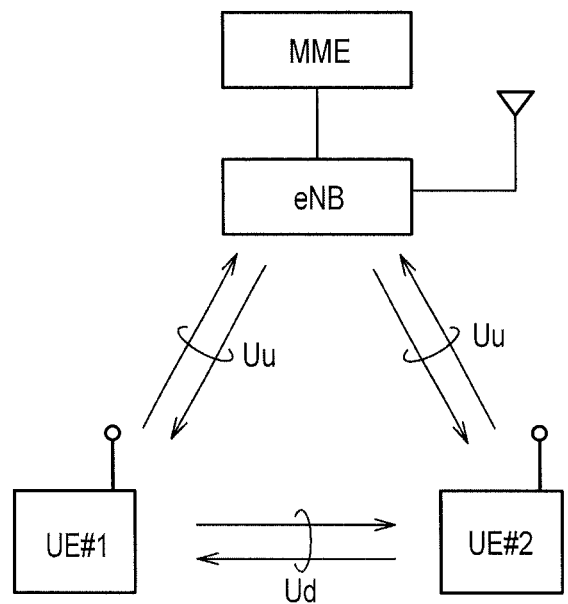
FIG. 1 is an overall configuration diagram of a mobile communication system according to a first embodiment of the present invention.

A mobile communication system according to the present embodiment is an LTE mobile communication system, and is, as illustrated in FIG. 1, provided with a mobility management entity MME and a radio base station eNB connected under control of the mobility management entity MME. Note that the present invention is applicable to a cellular mobile communication system other than the LTE system.

Here, it is configured such that a data signal is transmitted/received between the radio base station eNB and mobile stations UE#1/UE#2 through Uu interfaces, and a data signal is transmitted/received between the mobile station UE#1 and the mobile station UE#2 through a Ud interface.

That is, the mobile station UE#1 can transmit/receive a data signal to/from the mobile station UE#2 through the radio base station eNB (through the Uu interface), and can also transmit/receive a data signal to/from the mobile station UE#2 without through the radio base station eNB (through the Ud interface).

Similarly, the mobile station UE#2 can transmit/receive a data signal to/from the mobile station UE#1 through the radio base station eNB (through the Uu interface), and can also transmit/receive a data signal without through the radio base station eNB (through the Ud interface).

Figure 2:
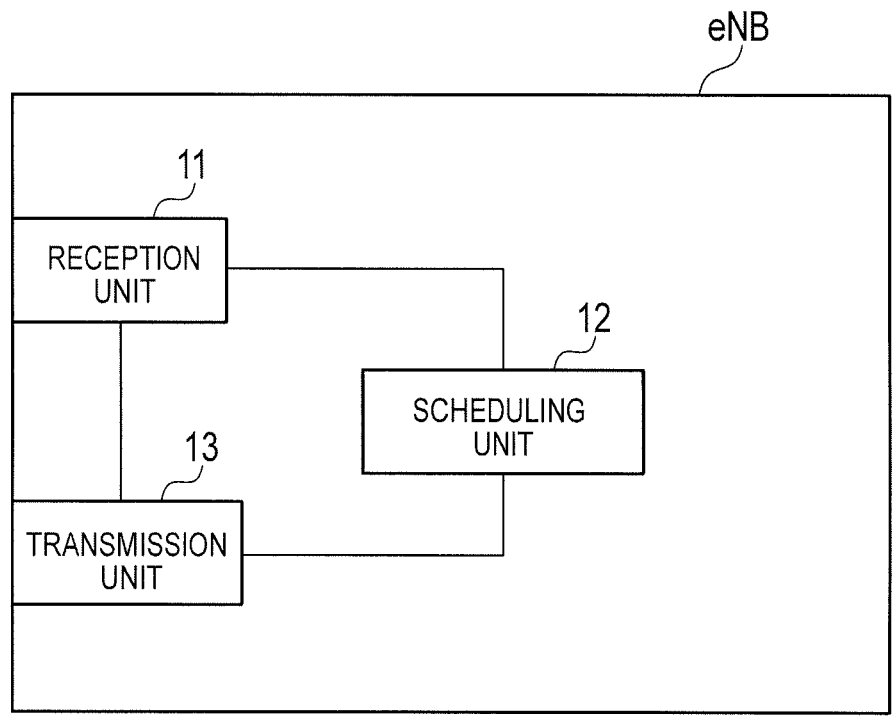
FIG. 2 is a function block diagram of a radio base station according to the first embodiment of the present invention.

As illustrated in FIG. 2, the radio base station eNB includes a reception unit 11, a scheduling unit 12, and a transmission unit 13.

The reception unit 11 is configured to receive a data signal and a control signal from the mobile station UE#1 or UE#2

The scheduling unit 12 is configured to perform a scheduling process with respect to the mobile stations UE#1 and UE#2.

For example, the scheduling unit 12 allocates a resource used for transmitting a reference signal (RS) #1 from the mobile station UE#1 to the mobile station UE#2 through the Ud interface, and a resource used for transmitting an RS #2 from the mobile station UE#2 to the mobile station UE#1 through the Ud interface.

Here, the scheduling unit 12 may be configured to allocate a particular resource block (RB) or resource element (RE) as the resource for transmitting the RS#1 and the RS#2.

The transmission unit 13 is configured to transmit a data signal and a control signal to the mobile stations UE#1 and UE#2.

For example, the transmission unit 13 is configured to transmit a setting signal #1 regarding the RS#1 to the mobile station UE#1 through the Uu interface, and to transmit a setting signal #2 regarding the RS#2 to the mobile station UE#2 through the Uu interface.

Figure 3:
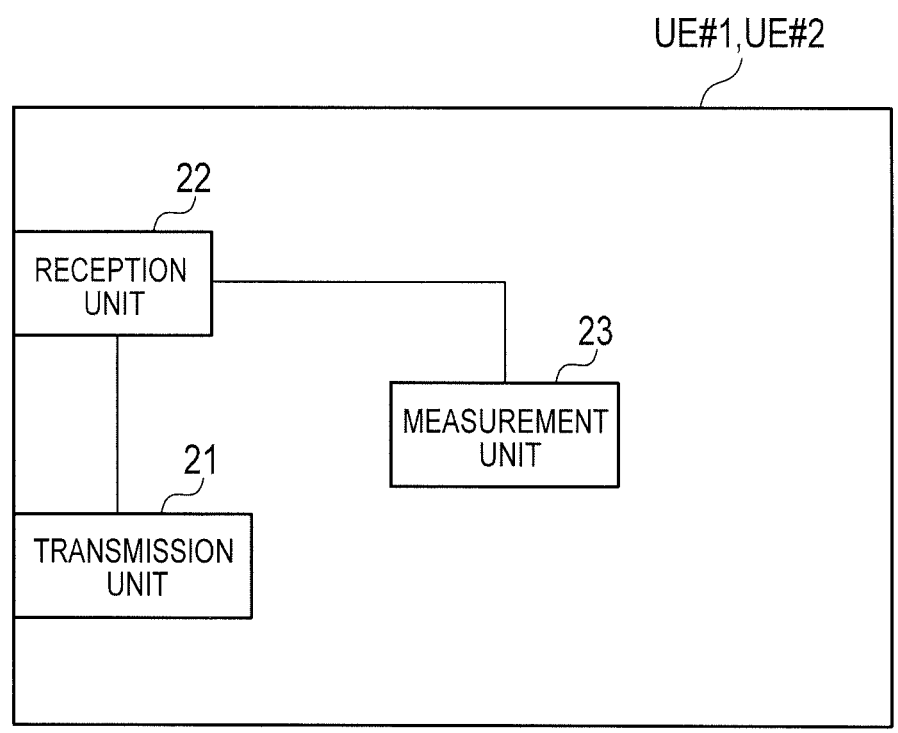
FIG. 3 is a function block diagram of a mobile station according to the first embodiment of the present invention.

As illustrated in FIG. 3, each of the mobile station UE#1 and UE#2 includes a transmission unit 21, a reception unit 22, and a measurement unit 23.

The transmission unit 21 of the mobile station UE#1 is configured to transmit a data signal and a control signal to the radio base station eNB through the Uu interface, and to transmit a data signal to the mobile station UE#2 through the Ud interface.

Similarly, the transmission unit 21 of the mobile station UE#2 is configured to transmit a data signal and a control signal to the radio base station eNB through the Uu interface, and to transmit a data signal to the mobile station UE#1 through the Ud interface.

The reception unit 22 of the mobile station UE#1 is configured to receive a data signal and a control signal from the radio base station eNB through the Uu interface, and to receive a data signal from the mobile station UE#2 through the Ud interface.

Similarly, the reception unit 22 of the mobile station UE#2 is configured to receive a data signal and a control signal from the radio base station eNB through the Uu interface, and to receive a data signal from the mobile station UE#1 through the Ud interface.

Here, it is configured such that, when the reception unit 22 of the mobile station UE#1 receives the setting signal #1 regarding the RS#1 from the radio base station eNB through the Uu interface, the transmission unit 21 of the mobile station UE#1 transmits the RS#1 to the mobile station UE#2 through the Ud interface using a resource specified by the setting signal #1.

Similarly, it is configured such that, when the reception unit 22 of the mobile station UE#2 receives the setting signal #2 regarding the RS#2 from the radio base station eNB through the Uu interface, the transmission unit 21 of the mobile station UE#2 transmits the RS#2 to the mobile station UE#1 through the Ud interface using a resource specified by the setting signal #2.

The measurement unit 23 of the mobile station UE#1 is configured to perform a measuring process with respect to the RS#2 received by the reception unit 22 of the mobile station UE#1.

For example, the measurement unit 23 of the mobile station UE#1 is configured to calculate channel state information (CSI) such as a channel quality indicator (CQI), a rank indicator (RI), and a precoding matrix indicator (PMI) based on the RS#1.

In addition, the measurement unit 23 of the mobile station UE#1 is configured to calculate RS received power (RSRP), RS received quality (RSRQ), a pathloss, and the like based on the RS#1.

Similarly, the measurement unit 23 of the mobile station UE#2 is configured to perform a measuring process with respect to the RS#1 received by the reception unit 22 of the mobile station UE#2.

For example, the measurement unit 23 of the mobile station UE#2 is configured to calculate CSI such as a CQI, an RI, and a PMI based on the RS#2.

In addition, the measurement unit 23 of the mobile station UE#2 is configured to calculate RSRP, RSRQ, a pathloss, and the like based on the RS#2.

Here, the reception unit 22 of the mobile station UE#1 may be configured to receive the setting signal #2 regarding the RS#2 from the radio base station eNB, and to receive the RS#2 transmitted by the mobile station UE#2 based on the setting signal #2.

Similarly, the reception unit 22 of the mobile station UE#2 may be configured to receive the setting signal #1 regarding the RS#1 from the radio base station eNB, and to receive the RS#1 transmitted by the mobile station UE#1 based on the setting signal #1.

In addition, the transmission unit 21 of the mobile station UE#1 may be configured to transmit a measurement report #1 including a measurement result of the RS#2 obtained by the measurement unit 23 to the radio base station eNB through the Uu interface.

The measurement report #1 may be called "CSI feedback #1", and the "CSI feedback #1" may include the CSI such as a CQI, an RI and a PMI. In addition, the "CSI feedback #1" may be transmitted as a control signal of a physical (PHY) layer or a MAC layer.

Further, the measurement report #1 may be called "measurement report #1", and the "measurement report #1" may include the information such as RSRP, RSRQ, and a pathloss. In addition, the "measurement report #1" may be transmitted as a control message of an RRC layer.

Similarly, the transmission unit 21 of the mobile station UE#2 may be configured to transmit a measurement report #2 including a measurement result of the RS#1 obtained by the measurement unit 23 to the radio base station eNB through the Uu interface.

The measurement report #2 may be called "CSI feedback #2", and the "CSI feedback #2" may include the CSI such as a CQI, an RI, and a PMI. Further, the "CSI feedback #2" may be transmitted as a control signal of a physical (PHY) layer or a MAC layer.

In addition, the measurement report #2 may be called "measurement report #2", and the "measurement report #2" may include the information such as RSRP, RSRQ, and a pathloss. Further, the "measurement report #2" may be transmitted as a control message of an RRC layer.

Hereinafter, an operation of a case in which transmission/reception of a data signal is performed between the mobile stations UE#1 and UE#2 through the Ud interface in the mobile communication system according to the present embodiment will be described with reference to FIG. 4.

As illustrated in FIG. 4, in step S1001, the mobile station UE#1 performs setting for starting transmission/reception of a data signal between the mobile stations UE#1 and UE#2 through the Ud interface.

For example, in step S1001, a common identifier "X-RNTI (radio network temporary identity)" used in the transmission/reception between the mobile stations UE#1 and UE#2 through the Ud interface is allocated.

In step S1002, the radio base station eNB allocates a resource used for transmitting the RS#1 from the mobile station UE#1 to the mobile station UE#2 through the Ud interface, and allocates a resource for transmitting the RS#2 from the mobile station UE#2 to the mobile station UE#1 through the Ud interface.

Here, in step S1002, the radio base station eNB may allocate the resource when the radio base station eNB detects a predetermined trigger.

For example, the radio base station eNB may determine that the radio base station eNB has detected the predetermined trigger when the radio base station eNB receives, from the mobile station UE#1 through the Uu interface, a scheduling request signal regarding transmission of a data signal to the mobile station UE#2, or when the radio base station eNB receives, from the mobile station UE#2 through the Uu interface, a scheduling request signal regarding transmission of a data signal to the mobile station UE#1.

In step S1003a, the radio base station eNB transmits the setting signal #1 regarding the RS#1 to the mobile station UE#1 through the Uu interface, and in step S1003b, the radio base station eNB transmits the setting signal #2 regarding the RS#2 to the mobile station UE#2 through the Uu interface.

Here, in step S1003a, the radio base station eNB may transmit the setting signal #2 regarding the RS#2 to the mobile station UE#1 through the Uu interface, and in step S1003b, the radio base station eNB may transmit the setting signal #1 regarding the RS#1 to the mobile station UE#2 through the Uu interface.

In addition, the setting signals #1 and #2 may be transmitted as a control message of an RRC layer, or may be transmitted as a control signal of a physical (PHY) layer or a MAC layer.

Further, the setting signal #1 includes information regarding at least one of a time, a frequency, and a code of the resource allocated to the RS#1, and the setting signal #2 includes information regarding at least one of a time, a frequency, a code of the resource allocated to the RS#2. Note that the setting signal may be called "scheduling signal".

Further, steps S1002, S1003a, and S1003b may be included in step S1001 as a part of step S1001.

In step S1004a, the mobile station UE#1 transmits the RS#1 to the mobile station UE#2 through the Ud interface using the resource specified with the setting signal #1.

Similarly, in step S1004b, the mobile station UE#2 transmits the RS#2 to the mobile station UE#1 through the Ud interface using the resource specified with the setting signal #2.

In step S1005a, the mobile station UE#1 performs a measuring process with respect to the RS#2 that has received by the mobile station UE#2, and in step S1006a, the mobile station UE#1 transmits the measurement report #1 including a measurement result of the RS#2 to the radio base station eNB through the Uu interface.

In step S1005b, the mobile station UE#2 performs a measuring process with respect to the RS#1 that has been received by the mobile station UE#1, and in step S1006b, the mobile station UE#2 transmits the measurement report #2 including a measurement result of the RS#1 to the radio base station eNB through the Uu interface.

In step S1007, the radio base station eNB performs a scheduling process in communication performed between the mobile stations UE#1 and UE#2 through the Ud interface based on the measurement result of the RS#2 included in the measurement report #1 and the measurement result of the RS#1 included in the measurement report #2.

According to the mobile communication system of the first embodiment of the present invention, the communication performed between the mobile stations UE#1 and UE#2 through the Ud interface can be controlled based on the result of the measuring process with respect to the RS#1 performed in the mobile station UE#2, the RS#1 having been received by the mobile station UE#1, and the result of the measuring process with respect to the RS#2 performed in the mobile station UE#1, the RS#2 having been received by the mobile station UE#2.

The characteristics of the above-described embodiment may be expressed in the following manner.

A first characteristic of the present embodiment is a mobile communication method for performing transmission/reception of a data signal between the mobile station UE#1 (first mobile station) and the mobile station UE#2 (second mobile station) through the Ud interface (interface between mobile stations) set between the mobile station UE#1 and the mobile station UE#2 without through the Uu interface (radio base station interface) set between the mobile stations and the radio base station eNB, the method including the steps of: transmitting, by the radio base station eNB, the setting signal #1 (first setting signal) regarding the RS#1 (first reference signal) to the mobile station UE#1 through the Uu interface; transmitting, by the radio base station eNB, the setting signal #2 (second setting signal) regarding the RS#2 (second reference signal) to the mobile station UE#2 through the Uu interface; transmitting, by the mobile station UE#1, the RS#1 to the mobile station UE#2 through the Ud interface based on the setting signal #1; and transmitting, by the mobile station UE#2, the RS#2 to the mobile station UE#1 through the Ud interface based on the setting signal #2.

The first characteristic of the present embodiment may include the steps of: transmitting, by the radio base station eNB, the setting signal #2 to the mobile station UE#1 through the Uu interface; transmitting, by the radio base station eNB, the setting signal #1 to the mobile station UE#2 through the Uu interface; receiving, by the mobile station UE#1, the RS#2 from the mobile station UE#2 through the Ud interface based on the setting signal #2; and receiving, by the mobile station UE#2, the RS#1 from the mobile station UE#1 through the Ud interface based on the setting signal #1.

The first characteristic of the present embodiment may include the steps of: transmitting, by the mobile station UE#1, the measurement report #1 (first measurement report) including the measurement result of the RS#2 to the radio base station eNB through the Uu interface; and transmitting, by the mobile station UE#2, the measurement report #2 (second measurement report) including the measurement result of the RS#1 to the radio base station eNB through the Uu interface.

In the first characteristic of the present embodiment, each of the setting signal #1 and the setting signal #2 may include information regarding at least one of a time, a frequency, and a code for transmitting the RS#1 or the RS#2.

A second characteristic of the present embodiment is the radio base station eNB used in the mobile communication system configured to be capable of performing transmission/reception of a data signal between the mobile station UE#1 and the mobile station UE#2 through the Ud interface without through the Uu interface, the radio base station eNB including: the transmission unit 13 configured to transmit the setting signal #1 regarding the RS#1 to the mobile station UE#1 through the Uu interface, and to transmit the setting signal #2 regarding the RS#2 to the mobile station UE#2 through the Uu interface, in which the setting signal #1 instructs a resource for transmitting the RS#1 from the mobile station UE#1 to the mobile station UE#2 through the Ud interface, and the setting signal #2 instructs a resource for transmitting the RS#2 from the mobile station UE#2 to the mobile station UE#1 through the Ud interface.

In the second characteristic of the present embodiment, the transmission unit 13 may be configured to transmit the setting signal #2 to the mobile station UE#1 through the Uu interface, and to transmit the setting signal #1 to the mobile station UE#2 through the Uu interface.

In the second characteristic of the present embodiment, each of the setting signal #1 and the setting signal #2 includes information regarding at least one of a time, a frequency, and a code for transmitting the RS#1 or the RS#2.

A third characteristic of the present embodiment is the mobile station UE used as the mobile station UE#1 in the mobile communication system configured to be capable of performing transmission/reception of a data signal between the mobile station UE#1 and the mobile station UE#2 through the Ud interface without through the Uu interface, the mobile station UE including the reception unit 22 configured to receive the setting signal #1 regarding the RS#1 from the radio base station eNB through the Uu interface, and the transmission unit 21 configured to transmit the RS#1 to the mobile station UE#2 through the Ud interface based on the setting signal #1.

In the third characteristic of the present embodiment, the mobile station UE may further include the measurement unit 23, in which the reception unit 22 may be configured to receive the setting signal #2 regarding the RS#2 from the radio base station eNB through the Ud interface, the reception unit 22 may be configured to receive, based on the setting signal #2, the RS#2 transmitted by the mobile station UE#2, the measurement unit 23 may be configured to perform a measuring process with respect to the received RS#2, and the transmission unit 21 may be configured to transmit the measurement report #1 including the measurement result of the RS#2 to the radio base station eNB through the Uu interface.

Note that the above-described operations of the radio base station eNB, the mobile stations UE, and the like may be implemented by hardware, by a software module executed by a processor, or by combination of the hardware and the software module.

The software module may be provided in a storage medium in an arbitrary format such as a random access memory (RAM), a flash memory, a read only memory (ROM), an erasable programmable ROM (EPROM), an electrically erasable and programmable ROM (EEPROM), a register, a hard disk, a removable disk, or a CD-ROM.

The storage medium is connected to the processor so that the processor can read/write information from/in the storage medium. In addition, the storage medium may be integrated in the processor. In addition, the storage medium and the processor may be provided in the ASIC. The ASIC may be provided in the radio base station eNB, the mobile station UE, or the like. In addition, the storage medium and the processor may be provided in the radio base station eNB, the mobile stations UE, or the like as a discrete component.

As described above, while the present invention has been described in details using the embodiment, it is apparent for a person skilled in the art that the present invention is not limited to the embodiment described in the present specification. The present invention can be implemented as a modification or an alternation without departing from the gist and scope of the present invention defined by the description of claims. Therefore, the description of the present specification intends illustration, and does not provide any restrictive meaning to the present invention.

Note that the entire content of Japanese Patent Application No. 2011-096312 (filed on Apr. 22, 2011) is herein incorporated in the present specification by reference.

INDUSTRIAL APPLICABILITY

As described above, according to the present invention, a mobile communication method, a radio base station, and a mobile station enables measurement of the radio quality among a plurality of mobile stations.

REFERENCE SIGNS LIST eNB radio base station
UE mobile station
11 and 22 reception unit
12 scheduling unit
13 and 21 transmission unit
23 measurement unit

The invention claimed is:

1. A mobile communication method for performing transmission/reception of a data signal between a first mobile station and a second mobile station through an interface between mobile stations set between the first mobile station and the second mobile station without through a radio base station interface set between the mobile stations and a radio base station, comprising the steps of:
  transmitting, by the radio base station, a first setting signal regarding a first reference signal to the first mobile station through the radio base station interface;
  transmitting, by the radio base station, a second setting signal regarding a second reference signal to the second mobile station through the radio base station interface;
  transmitting, by the first mobile station, the first reference signal to the second mobile station through the interface between mobile stations based on the first setting signal; and
  transmitting, by the second mobile station, the second reference signal to the first mobile station through the interface between mobile stations based on the second setting signal.

2. The mobile communication method according to claim 1, comprising the steps of:
  transmitting, by the radio base station, the second setting signal to the first mobile station through the radio base station interface;
  transmitting, by the radio base station, the first setting signal to the second mobile station through the radio base station interface;
  receiving, by the first mobile station, the second reference signal from the second mobile station through the interface between mobile stations based on the second setting signal; and
  receiving, by the second mobile station, the first reference signal from the first mobile station through the interface between mobile stations based on the first setting signal.

3. The mobile communication method according to claim 2, comprising the steps of:
- transmitting, by the first mobile station, a first measurement report including a measurement result of the second reference signal to the radio base station through the radio base station interface; and
- transmitting, by the second mobile station, a second measurement report including a measurement result of the first reference signal to the radio base station through the radio base station interface.

4. The mobile communication method according to claim 1, wherein each of the first setting signal and the second setting signal includes information regarding at least one of a time, a frequency, and a code for transmitting the first reference signal or the second reference signal.

5. A radio base station used in a mobile communication system configured to be capable of performing transmission/reception of a data signal between a first mobile station and a second mobile station through an interface between mobile stations set between the first mobile station and the second mobile station without through a radio base station interface set between the mobile stations and a radio base station, the radio base station comprising:
- a transmission unit configured to transmit a first setting signal regarding a first reference signal to the first mobile station through the radio base station interface, and to transmit a second setting signal regarding a second reference signal to the second mobile station through the radio base station interface,
- wherein the first setting signal instructs a resource for transmitting the first reference signal from the first mobile station to the second mobile station through the interface between mobile stations, and
- the second setting signal instructs a resource for transmitting the second reference signal from the second mobile station to the first mobile station through the interface between mobile stations.

6. The radio base station according to claim 5, wherein the transmission unit transmits the second setting signal to the first mobile station through the radio base station interface, and transmits the first setting signal to the second mobile station through the radio base station interface.

7. The radio base station according to claim 5, wherein each of the first setting signal and the second setting signal includes information regarding at least one of a time, a frequency, a code for transmitting the first reference signal or the second reference signal.

8. A mobile station used as a first mobile station in a mobile communication system configured to be capable of performing transmission/reception of a data signal between the first mobile station and a second mobile station through an interface between mobile stations set between the first mobile station and the second mobile station without through a radio base station interface set between the mobile stations and a radio base station, the mobile station comprising:
- a reception unit configured to receive a first setting signal regarding a first reference signal from the radio base station through the radio base station interface; and
- a transmission unit configured to transmit the first reference signal to the second mobile station through the interface between mobile stations based on the first setting signal.

9. The mobile station according to claim 8, further comprising:
- a measurement unit,
- wherein the reception unit is configured to receive a second setting signal regarding a second reference signal from the radio base station through the radio base station interface,
- the reception unit is configured to receive, based on the second setting signal, the second reference signal transmitted by the second mobile station.
- the measurement unit is configured to perform a measuring process with respect to the received second reference signal, and
- the transmission unit is configured to transmit a first measurement report including a measurement result of the second reference signal to the radio base station through the radio base station interface.

* * * * *